United States Patent [19]

Stratton

[11] Patent Number: 4,707,740
[45] Date of Patent: Nov. 17, 1987

[54] SYNC DETECTOR HAVING NOISE ADJUSTED SLICE LEVEL

[75] Inventor: Boyd L. Stratton, Woodside, Calif.
[73] Assignee: Harris Corporation, Melbourne, Fla.
[21] Appl. No.: 850,811
[22] Filed: Apr. 11, 1986
[51] Int. Cl.$^4$ ............................................... H04N 5/08
[52] U.S. Cl. ..................................... 358/153; 358/155
[58] Field of Search ................ 358/153, 155, 156, 148

[56] References Cited

U.S. PATENT DOCUMENTS 4,185,299  1/1980  Harford ............................. 358/153
4,357,629 11/1982  McGinn ............................. 358/153

FOREIGN PATENT DOCUMENTS 0187078 11/1983  Japan .................................. 358/153

OTHER PUBLICATIONS

"Variable Threshold Circuit Separates Sync Pulses from Composite Video Signal", Strange, Electronic Design, vol. 20–No. 21, Oct. 12, 1972, p. 100.

Primary Examiner—James J. Groody
Assistant Examiner—Michael D. Parker
Attorney, Agent, or Firm—Tarolli, Sundheim & Covell

[57] ABSTRACT

A sync detector is provided for recovering or extracting a sync signal from a video signal. The circuitry includes a slice level comparator for comparing the video signal against a slice level signal for providing a sync signal in dependence upon the comparison. The slice level signal is adjusted as a function of noise measured during a nonpicture portion of the video signal.

10 Claims, 8 Drawing Figures

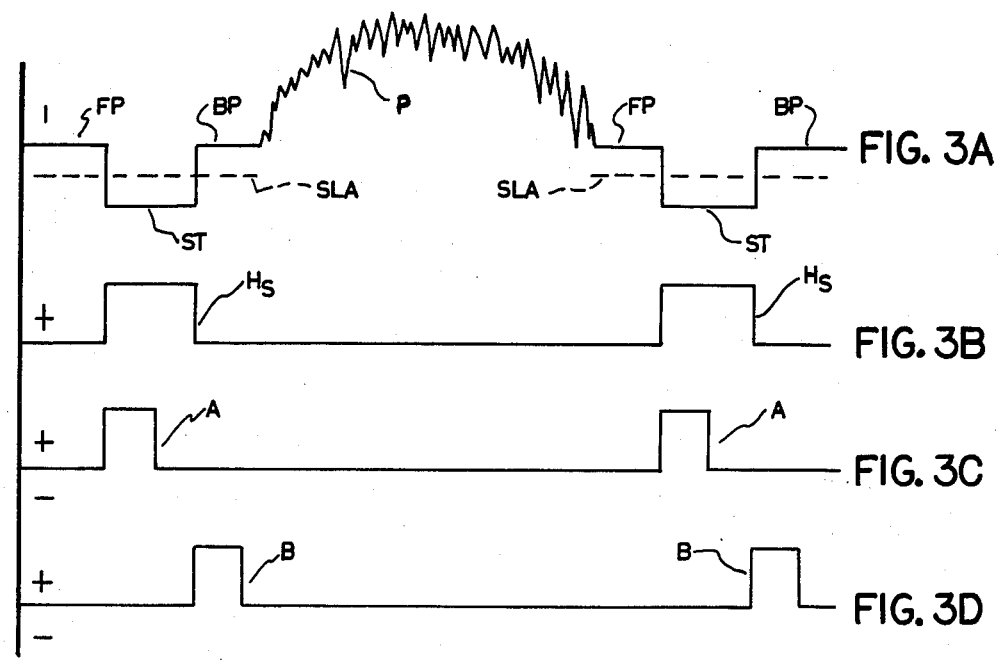
FIG. 3A
FIG. 3B
FIG. 3C
FIG. 3D
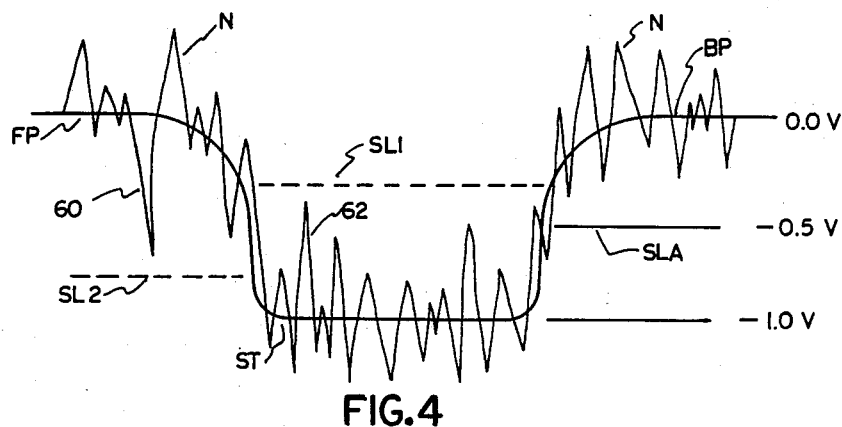
FIG. 4
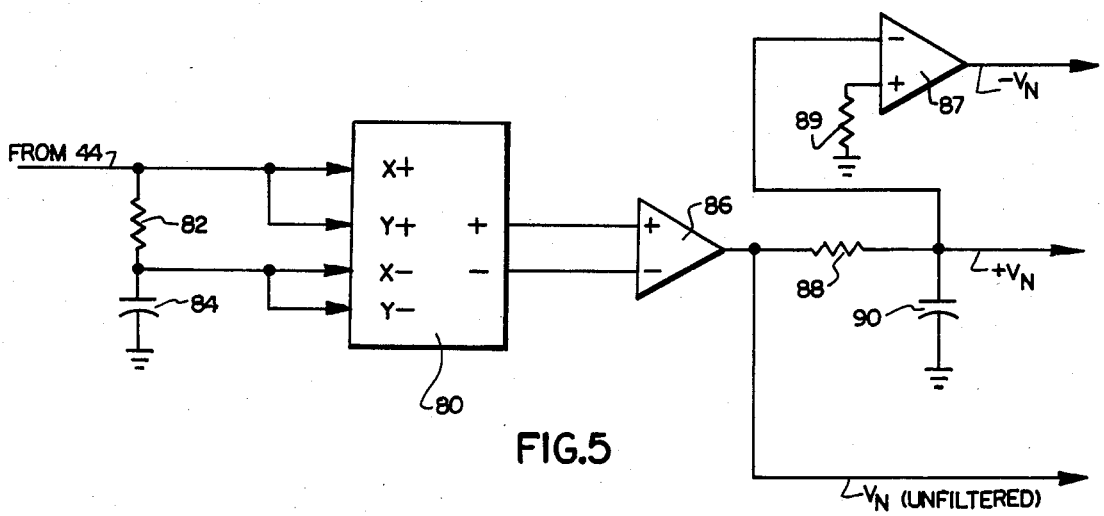
FIG. 5

SYNC DETECTOR HAVING NOISE ADJUSTED SLICE LEVEL

BACKGROUND OF THE INVENTION

This invention relates to the art of processing video signals and, more particularly, to separating synchronizing signals from a video signal wherein the slicing level of the sync separating circuitry is varied as a function of noise in a nonpicture portion of a video signal.

Sync separators circuits are known in the art for recovering synchronizing information from a composite video signal. The composite video signal typically includes periodic nonpicture portions, as well as picture information. The nonpicture portions may include, for example, a front porch portion, a sync tip portion and a back porch portion. The front porch portion and the back porch portion may have the same DC level and straddle the sync tip portion which is at a different DC level, such as a more negative level with respect to the other portions. The recovery circuit may include a sync slicer which serves to compare the incoming video signal with a threshold known as the slicing level. So long as the input signal is more negative than the slicing level, a sync signal is provided. The slicing level is typically chosen so as to be midway between that of the front porch or back porch portion and that of the sync tip portion. However, in the presence of noise on the video signal, the sync slicer may erroneously provide an output sync signal when the noise excursions cross the slicing level. Consequently, it is desirable to provide such a sync separator circuit with a slicing level which varies to compensate for noise that may be present on the video signal to prevent erroneous generation of an output sync signal.

It is known in the art to provide sync separator circuits having means for providing variable slicing levels. Such are found, for example, in the U.S. Pat. Nos. to J. R. Harford, 4,185,299, and M. McGinn, 4,357,629. The sync separator circuits in these patents are provided with means for varying the slicing level with variations in the magnitude of the input video signal. However, neither McGinn nor Harford provides circuitry for varying the slice level as a function of measured noise. Harford suggests that the recovered sync signal undergo wave shaping or filtering in the presence of noise.

SUMMARY OF THE INVENTION

It is a principal object of the present invention to provide an improved sync separator circuit having a slicing level which is adjusted in dependence upon noise as measured during a nonpicture portion of the video signal.

It is a still further object of the present invention to provide such an improved sync separator circuit wherein the noise is measured during the sync tip portion of an input video signal.

In accordance with one aspect of the present invention, there is provided a sync detector having a noise adjusted slice level and which includes a noise detector for measuring the noise level of an input video signal during a nonpicture portion thereof. This measured noise level is used to modify the magnitude of the slice level applied to a sync slicer comparator which compares the adjusted slice level with the incoming video signal for recovering the sync signal therefrom.

BRIEF DESCRIPTION OF THE DRAWINGS

The foregoing and other objects and advantages of the invention will become more readily apparent from the following description of the preferred embodiment of the invention as taken in conjunction with the accompanying drawings which are a part hereof and wherein:

FIGS. 3A-3D are waveforms useful in describing the operation herein;

FIG. 4 is a waveform useful in describing the operation herein; and

FIG. 5 illustrates the noise detector in greater detail than that illustrated in FIG. 2.

DESCRIPTION OF PREFERRED EMBODIMENT

Figure 1:
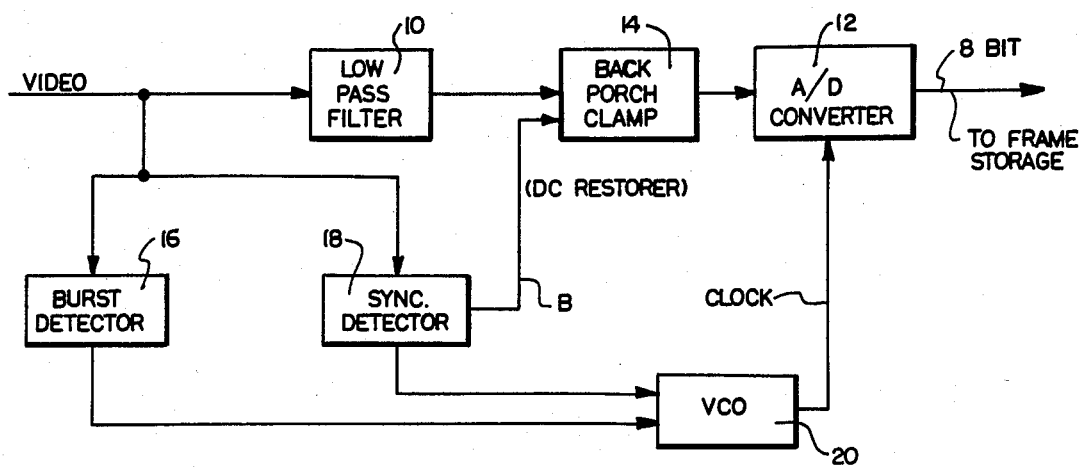
FIG. 1 is a schematic-block diagram illustration of a portion of a frame synchronizer employing the present invention.

Reference is now made to the drawings for purposes of presenting a preferred embodiment of the invention only and not for purposes of limiting same. Reference is now made to FIG. 1 which illustrates a portion of an input processor circuit of a frame synchronizer for processing the signals. The composite video signal is passed by a low pass filter 10, which in this example may be considered as passing signals up to a frequency of 5.5 MHz. This is within the range of operation of an analog-to-digital converter 12 which converts the analog video signal into a train of 8 bit digital samples which may be supplied to a frame storage for subsequent use. Prior to the video signal being applied to the analog-to-digial converter 12, it is passed through a back porch clamp circuit 14 to clamp a predetermined nonpicture portion to a desired level. Sometimes a back porch clamp circuit is referred to as a DC restorer and both terms may be employed herein for the same circuit. In this application, a video signal is clamped to a DC level on the order of −2.0 volts in the back porch portion of the video signal. The intelligence or picture content portion of the video signal will then vary between −2 volts and 0 volts which is within the operating range of the analog-to-digital converter. In some applications, the video signal may be clamped to ground level or some other desired signal level. Additionally, the circuitry in FIG. 1 includes a burst detector 16, which may be of conventional design, and a sync detector 18, which is conventionally employed for supplying timing information to a voltage controlled oscillator 20 which, in turn, provides clock pulses to operate the analog-to-digital converter 12.

Figure 2:
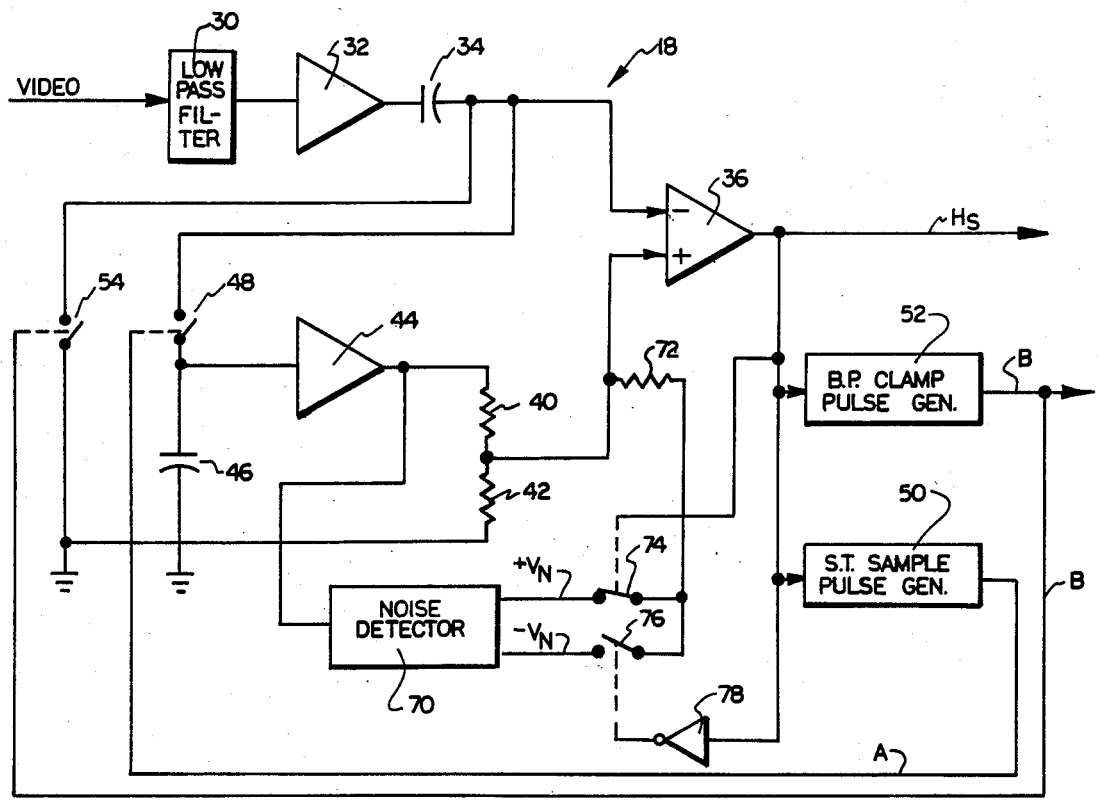
FIG. 2 is a schematic-block diagram illustration of the sync detector shown in the block diagram of FIG. 1.

Reference is now made to FIG. 2 which provides a more detailed illustration of the sync detector 18 in FIG. 1. The video signal is first passed through a low pass filter 30 which, for example, passes signals having a frequency up to 1.5 MHz. This, then, is a small portion of the frequency band of the video signal. The filtered video signal is then passed by a buffer 32 and a capacitor 34 to the negative input of a comparator 36 which operates as a sync slicer. This comparator 36 compares the filtered video signal with a threshold for the purposes of recovering the sync signal from the filtered video signal. This may be appreciated with reference to the waveforms in FIGS. 3A and 3B.

The waveform in FIG. 3A is representative of the composite video signal. As seen, the video signal has a picture portion P intermediate the front porch portion FP and a back porch portion BP. A horizontal sync signal separates the front porch portion from the back porch portion and this sync signal is referred to as the sync tip ST. Conventionally, the front porch portion and the back porch portion are at the same DC signal level, such as ground. The sync tip is also maintained at a constant level which is conventionally negative with respect to the front porch or back porch portions.

The sync slicer 36 compares a threshold signal with the filtered composite video signal in order to recover or detect the horizontal synchronizing signal and produce a horizontal sync signal $H_S$ in accordance therewith (see FIG. 3B). The threshold in FIG. 2 is obtained from the junction of a pair of resistors 40 and 42 connected between the output of a buffer 44 and ground. It should be noted that whereas ground potential is illustrated herein, a different reference level may be employed. The buffer 44 obtains its input from a charge stored on a capacitor 46, a sample and hold arrangement. This arrangement also includes a switch 48 which is periodically closed in synchronization with detection of the horizontal sync pulse to complete a path so that the filtered composite video signal may be sampled and stored in capacitor 46. The sampled voltage takes place during the sync tip portion ST of the video signal. The capacitor 46 charges toward this level and the charge of the capacitor is buffered through buffer 44 and applied across the voltage divider consisting of resistors 40 and 42 to provide a threshold level to the positive input of the sync slicer 36. Whenever the filtered video input signal becomes negative with respect to the threshold, the sync slicer 36 will output a positive pulse representing the horizontal sync signal $H_S$, as is seen in FIG. 3B. The leading edge of the horizontal sync signal triggers a sync tip sample pulse generator 50 to produce a sync tip control signal A (FIG. 3C) which is then employed for closing switch 48 during the sync tip portion ST of the filtered video signal. Similarly, the lagging edge of the horizontal sync signal $H_S$ triggers a back porch clamp pulse generator 52 to produce a trigger signal B (see FIG. 3D) which is employed to temporarily close a switch 54 so as to clamp the filtered video signal to ground during the back porch portion BP.

Referring again to FIGS. 2, 3A and 3B, it is recalled that the horizontal sync signal $H_S$ is produced when the fitered video signal has its DC level change to the point that it is more negative than the threshold supplied to the positive input of the sync slicer 36. The reference level or threshold may be called the slice level SLA. This is illustrated in FIG. 3A as being midway between that of the back porch portion BP and the sync tip portion ST. For example, if the back porch portion BP is at 0 volts and the sync tip portion ST is normally at −1.0 volts, then the threshold or slice level SLA may be set a 31 0.5 volts. Consequently, as the video signal becomes more negative than the threshold or slice level SLA, the output of comparator 36 will go positive and stay positive to provide the horizontal sync signal $H_S$ until the video sync signal once again increases positively toward the back porch level and becomes more positive than the threshold or slice level SLA. This is illustrated in FIGS. 3A and 3B. The discussion thus far assumes that there is no noise to contend with during the horizontal sync recovery.

Reference is now made to FIG. 4 which illustrates the video signal having noise and located on what was assumed to be constant level nonpicture portions, including the front porch FP, the sync tip ST, and the back porch BP, as well as the transitions between these levels. The noise includes peaks and valleys which may cross the normal slice level SLA at times which will create a false indication of a horizontal sync signal recovery. For example, a noise valley point 60 in FIG. 4 is clearly more negative than the slice level SLA and this would cause the sync slicer 36 to erroneously produce an indication of a horizontal sync signal. Similarly, a noise peak point 62 is clearly more positive than the slice level SLA and would cause the sync slicer 36 to erroneously provide an indication that the horizontal sync recovery has been completed. Consequently, noise such as that illustrated in FIG. 4 can provide erroneous horizontal sync recovery information.

In accordance with the embodiment illustrated in FIG. 2, the threshold or slice level is varied in the presence of noise from that of its low noise or normal threshold level SLA. For example with reference to FIG. 4, in the presence of noise, the negative going valley point 60 while being more negative than slice level SLA is not more negative than an offset slice level SL2. However, as the video signal becomes more negative than the offset slice level SL2, the comparator 36 will provide a positive horizontal sync signal. Similarly, whereas the noise peak 62 is more positive than the low noise or normal slice level SLA, it is not more positive than the modified or offset slice level SL1. However, as the video signal becomes more positive, it will exceed that of the offset slice level SL1, causing a termination of the horizontal sync signal. This operation is achieved by employing a noise detector generating information to modify the slice level during noisy conditions as measured during one of the predetermined nonpicture portions of the video signal.

In the embodiment of FIG. 2, the noise level is measured by a noise detector 70, to be described in greater detail hereinafter, which measures noise during the sync tip sample periods and provides an output indication representative of the average noise. This includes a positive signal $+V_N$, as well as a negative signal $-V_N$ to be added or subtracted to the normal slice level SLA so as to vary the slice level in accordance with measured noise. Both of these offset adjustments are supplied to the positive input of the sync slicer operational amplifier 36 by way of a resistor 72 which scales the offset signal. These offset signals are supplied by way of switches 74 and 76 which operate such that when one of the switches is closed, the other is open. The switch control is obtained from the 36 such that when the output of the amplifier is positive (during a sync tip interval), the switch 74 is closed, as is shown in FIG. 2, so that the slice level is raised to that of slice level SL1. When the output of the comparator 36 is at ground potential (during the front porch or back porch portions) the switch 74 is open and switch 76 becomes closed by way of an inverter 78. It is to be appreciated that whereas switches 74 and 76 are illustrated as simple mechanical switches, they, in practice, would normally take the form of solid state switches operated in a well known manner. The noise detector 70 is discussed in greater detail with reference to FIG. 5.

Reference is now made to FIG. 5 which illustrates the noise detector in greater detail. This detector may be considered as an analog multiplier filtered at its input and its output. The analog multiplier 80 may conventionally take the form of an analog multiplier provided by Motorola Corporation and known as their Model MC1495. The input to multiplier 80 is taken from the output of buffer 44 (FIG. 2) and is supplied to unfiltered X+ and Y+ inputs of the multiplier. The signal from buffer 44 is also applied through a resistor 82 and a capacitor 84 to ground. The junction of resistor 82 and capacitor 84 supplies a filtered second input to the X− and Y− inputs of the multiplier 80. The multiplier effectively multiplies the difference between the inputs applied to the X+ and X− terminals by the difference between the inputs applied to the Y+ and Y− inputs. The outputs taken from the positive and negative output terminals of the multiplier 80 provide a balanced output and this is supplied to an operational amplifier 86 with its output being supplied to a filter including resistor 88 and a capacitor 90 taken to ground. The signal across resistor 82 represents fluctuations of the input signal at 44 caused by noise. This signal is multiplied by itself by multiplier 80 to give an absolute representation of noise at the output of amplifier 86. This, then, provides an output $+V_N$ which represents the average noise over several lines of video information. A negative output $-V_N$ may be obtained with an inverter amplifier 87 having its positive input connected to ground through a resistor 89.

Although the invention has been described with respect to a preferred embodiment, it is to be appreciated that various modifications may be made without departing from the spirit and scope of the invention as defined by the appended claims.

Having described a specific preferred embodiment of the invention, the following is claimed:

1. Sync separator circuit for receiving a video signal and providing a sync signal recovered therefrom wherein said video signal includes predetermined non-picture portions containing sync signal information and comprising:
   noise detector means responsive to said video signal during said non picture portions thereof for providing a noise signal having a magnitude representative of the average noise level on said nonpicture portions thereof;
   sync slicer means for comparing said video signal with a slice level signal and providing said sync signal in dependence upon said comparison;
   means for providing said slice level signal; and
   means responsive to said noise signal for varying the magnitude of said slice level signal as a function of noise on said predetermined nonpicture portions of said video signal.

2. A circuit as set forth in claim 1 wherein said nonpicture portions include a sync tip portion and a back porch portion and wherein said noise detector means is responsive during one of said portions for providing said noise signal.

3. A circuit as set forth in claim 2 wherein each of said portions has a normal DC level and said sync tip portion has a normal DC level which is different than that of said back porch portion.

4. A circuit as set forth in claim 3 wherein said sync slicer means provides said sync signal so long as said video signal is less than said slice level signal.

5. A circuit as set forth in claim 4 wherein said slice level signal is normally set at a value midway between that of said sync tip portion and said back porch portion.

6. A circuit as set forth in claim 5 including means for varying said slice level signal in a direction away from that of the level of said sync tip portion when said sync slicer means provides said sync signal with the increased slice level signal being dependent on the magnitude of said noise signal.

7. A circuit as set forth in claim 5 including means for varying said slice level signal in a direction toward that of the level of said sync tip portion prior to said sync slicer means providing said sync signal and with the variation in said slice level signal being dependent on the magnitude of said noise signal.

8. A circuit as set forth in claim 5 wherein said noise detector means provides a first slice offset signal of a first DC level and a second slice offset signal of a second DC level and switching means controlled by said slicer means for combining one of said offset signals with said slice level signal in dependence upon the output of said sync slicer means.

9. A circuit as set forth in claim 8 wherein said sync slicer means provides said sync signal only so long as said video signal exceeds said slice level signal in the direction of the level of said sync tip portion.

10. A circuit as set forth in claim 9 wherein said switching means responds to said sync signal from said sync slicer means for combining said first offset signal with said slice level signal to increase said slice level signal in a first direction with the increase in magnitude being dependent upon the magnitude of said noise signal.

* * * * *